(12) United States Patent
Kuang et al.

(10) Patent No.: US 8,408,060 B2
(45) Date of Patent: Apr. 2, 2013

(54) PIEZOELECTRIC TRANSDUCERS AND INERTIAL SENSORS USING PIEZOELECTRIC TRANSDUCERS

(75) Inventors: Jinbo Kuang, Acton, MA (US); William Albert Clark, Winchester, MA (US); John Albert Geen, Tewksbury, MA (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 13/461,961

(22) Filed: May 2, 2012

(65) Prior Publication Data

US 2012/0210790 A1 Aug. 23, 2012

Related U.S. Application Data

(62) Division of application No. 12/208,803, filed on Sep. 11, 2008, now abandoned.

(51) Int. Cl.
G01C 19/56 (2006.01)

(52) U.S. Cl. .................................................. 73/504.13

(58) Field of Classification Search ............... 73/504.12, 73/504.13
See application file for complete search history.

(56) References Cited

U.S. PATENT DOCUMENTS

| | | | |
|---|---|---|---|
| 4,655,081 A | 4/1987 | Burdess | 73/505 |
| 5,616,864 A * | 4/1997 | Johnson et al. | 73/504.13 |
| 5,767,405 A | 6/1998 | Bernstein et al. | 73/504.16 |
| 6,151,964 A | 11/2000 | Nakajima | 73/504.13 |
| 6,209,393 B1 | 4/2001 | Tomikawa et al. | 73/504.12 |
| 6,438,242 B1 | 8/2002 | Howarth | 381/190 |
| 6,877,374 B2 | 4/2005 | Geen | 73/504.14 |
| 7,032,451 B2 | 4/2006 | Geen | 73/504.14 |
| 7,043,985 B2 | 5/2006 | Ayazi et al. | 73/504.04 |
| 7,089,792 B2 | 8/2006 | Geen | 73/504.14 |
| 7,204,144 B2 | 4/2007 | Geen | 73/504.14 |
| 7,216,539 B2 | 5/2007 | Geen | 73/504.14 |
| 7,357,025 B2 | 4/2008 | Geen | 73/504.12 |
| 7,637,156 B2 * | 12/2009 | Araki et al. | 73/504.13 |
| 8,056,413 B2 * | 11/2011 | Yazdi | 73/504.13 |

(Continued)

FOREIGN PATENT DOCUMENTS

| | | |
|---|---|---|
| EP | 0860685 | 8/1998 |
| JP | 09116250 | 5/1997 |

(Continued)

OTHER PUBLICATIONS

Ayazi et al., Design and Fabrication of A High-Performance Polysilicon Vibrating Ring Gyroscope; Center for Integrated Sensors and Circuits; Eleventh IEEE/ASME International Workshop on Micro Electro Mechanical Systems, Heidelberg, Germany, Jan. 25-29, 1998.

(Continued)

*Primary Examiner* — John Chapman, Jr.
(74) *Attorney, Agent, or Firm* — Sunstein Kann Murphy & Timbers LLP

(57) ABSTRACT

An inertial sensor includes driving piezoelectric transducers for enabling an oscillation of a resonator, sensing piezoelectric transducers for enabling a detection of a movement of the inertial sensor, and piezoelectric compensating elements substantially equidistantly among the driving and the sensing piezoelectric transducers, wherein the compensating elements and the resonator form corresponding capacitors having capacitive gaps, and wherein, during the oscillation of the resonator, changes in electrostatic charges stored in the capacitors are measured with the compensating elements and are modified so as to modify the oscillation of the resonator.

20 Claims, 14 Drawing Sheets

U.S. PATENT DOCUMENTS

| | | | |
|---|---|---|---|
| 2004/0085000 A1 | 5/2004 | Ogiura | 310/329 |
| 2005/0072230 A1 | 4/2005 | Koike et al. | 73/504.12 |

FOREIGN PATENT DOCUMENTS

| | | |
|---|---|---|
| WO | WO 2007/061610 | 5/2007 |

OTHER PUBLICATIONS

Ayazi et al., High Aspect-Ratio Combined Poly and Single-Crystal Silicon (HARPSS) MEMS Technology; Journal of Microelectromechanical Systems, vol. 9, No. 3, Sep. 2000.

Ayazi et al., A HARPSS Polysilicon Vibrating Ring Gyroscope Journal of Microelectromechanical Systems, vol. 10, No. 2, Jun. 2001.

Geen et al., New iMEMS® Angular-Rate-Sensing Gyroscope; ADI Micromachined Products Division; Analog Dialogue 37-4, 2003.

Link, "Angular Rate Detector DAVED®-RR," Application Report SE 090.2; Institute of Micromachining and Information Technology, http://hsgimit.de/fileadmin/gfx/pdfs/AnwendungsberichtSE090$_{13}$ 2rr_englisch_V1.pdf, 1 page, Dec. 11, 2007.

Link, "Angular Rate Detector DAVED®-LL," Application Report SE 100.1; Institute of Micromachining and Information Technology, hsg-imit.de/fileadmin/gfx/pdfs/anwendungsberichtse100_111_englisch01.pdf, 1 page, Dec. 11, 2007.

Nasiri, "A Critical Review of MEMS Gyroscopes Technology and Commercialization Status," InvenSense, www.scantec.de/uploads/media/MEMSGyroComp_02.pdf, 8 pages, 2005.

Yang et al., An electro-thermal bimorph-based microactuator for precise track-positioning of optical disk drives; J. Micromech. Microeng., v. 15, pp. 958-965, 2005.

International Searching Authority, International Search Report—International Application No. PCT/US2009/056456, dated Feb. 16, 2010, together with the Written Opinion of the International Searching Authority, 18 pages.

NEC TOKIN, "Ceramic Gyro™," NEC TOKIN's Piezoelectric Devices, http://www.nec-tokin.com/english/product/piezodevice2/ceramicgyro.html, May 1, 2012, 5 pages.

* cited by examiner

Linear resonator gyroscope, from web-page of HSG-IMIT

Comb-drive tuning forks MEMS gyroscope

Schematic design concept of a vibrating wheel MEMS-gyroscope

Poly-Si ring gyroscope, from Ayazi & Najafi reference

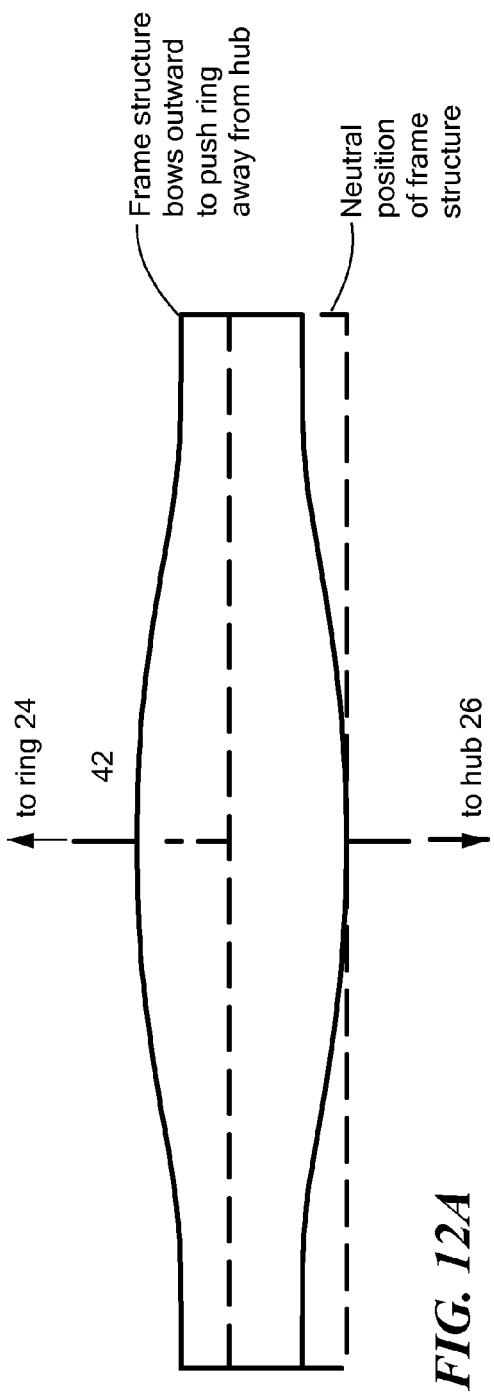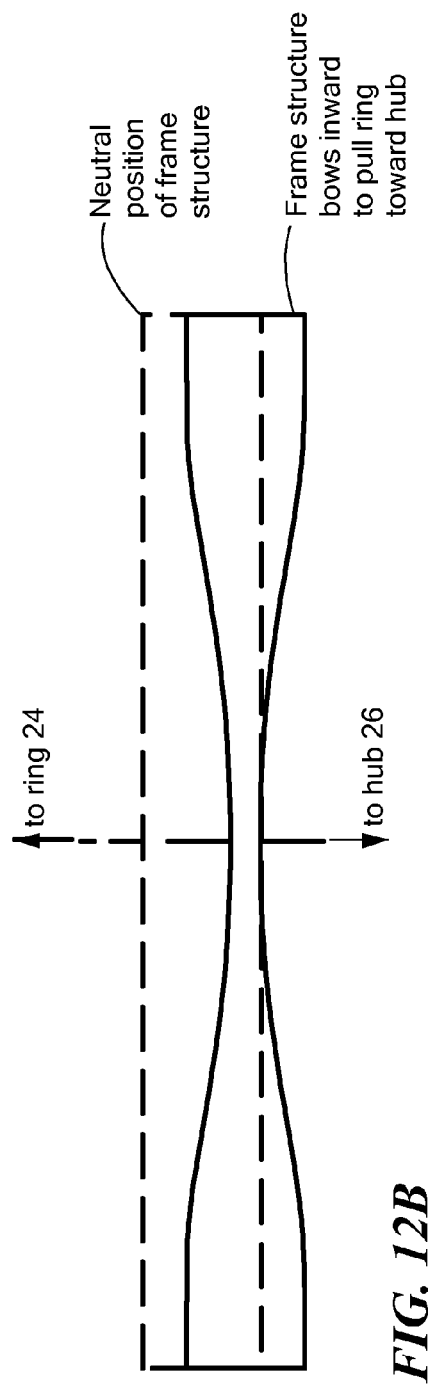
FIG. 12A
FIG. 12B

PIEZOELECTRIC TRANSDUCERS AND INERTIAL SENSORS USING PIEZOELECTRIC TRANSDUCERS

CROSS-REFERENCE TO RELATED APPLICATION(S)

This patent application is a divisional of, and therefore claims priority from, U.S. patent application Ser. No. 12/208,803 filed on Sep. 11, 2008, which is hereby incorporated herein by reference in its entirety.

TECHNICAL FIELD

The present invention relates generally to inertial sensors, and more particularly to microelectromechanical inertial sensors for measuring a rotational motion, such as ring gyroscopes.

BACKGROUND ART

It is known in the prior art to use inertial motion sensors to track the position, orientation, and velocity (linear or angular) of objects in the inertial reference frame, without the need for external references. Inertial motion sensors generally include gyroscopes, accelerators, and other motion-sensing devices. Gyroscopes are well-known and used for measuring or maintaining orientation based on the principles of conservation of angular momentum. Vibrating structure gyroscopes, due to their simplicity and low cost, gained popularity since 1980s over conventional, rotating gyroscopes. The physical principle of a vibrating structure gyroscope is very intelligible: a vibrating object tends to keep vibrating in the same plane as its support is rotated. In engineering literature, this type of device is also known as a Coriolis vibratory gyro because, as the plane of oscillation is rotated, the response detected by a transducer of the device results from the Coriolis effect (as in a conventional rotating gyroscope). The Coriolis effect is an apparent deflection of moving objects from a straight path when they are viewed in a rotating frame of reference, and is caused by the Coriolis force, which is considered in the equation of motion of an object in a rotating frame of reference and depends on the velocity of the moving object, and centrifugal force. By determining the Coriolis force, a rotation of the object can be described. Both the Coriolis force and the Coriolis effect are well known in the art.

Some of vibrating gyroscopes utilize piezoelectric oscillators to capture the rotational movements of objects, (see, e.g., Ceramic Gyro™ devices by NEC-TOKIN Corporation of Japan, www.nec-tokin.com). In such conventional, bulk piezoelectric gyroscopes, used as, for example, angular velocity sensors, a piezoelectric element torsionally vibrates a rod, which causes the rod to work as a pendulum. Then, the value of the Coriolis force, which occurs when the rod is rotated, is extracted after it is converted into voltage by the piezoelectric element.

With material-micromachining becoming a rapidly developing technology in recent years, silicon (Si) based microelectromechanical systems (MEMS) and devices enriched the field of inertial sensors by offering relatively inexpensive vibrating structure gyroscopes. A general discussion of MEMS-based gyroscopes is provided, for example, by Steven Nasiri, "A critical review of MEMS gyroscopes technology and commercialization status", ca. 2005, available at http://www.invensense.com/shared/pdf/MEMSGyroComp.pdf To date, MEMS-based gyroscopes have been implemented in several embodiments. Some single-mass linear resonators, for example, utilize a single mass oscillating to and fro along the "sensitive" axis of the device, like a balance in a watch (see, e.g., FIG. 1, illustrating a device by HSG-IMIT, Institut für Mikro- und Informationstechnik, or Institute for Micromachining and Information Technology, of Germany, http://www.hsg-imit.de/index.php?id=41&L=1). If such linear device is rotated around an axis parallel to its sensitive axis, Coriolis forces induce a second oscillation oriented perpendicular to the direction of the (primary) oscillation of the mass.

Another variation of a linear-resonator gyroscope is based on a tuning-fork idea, for example, as implemented by the Draper Laboratory of Massachusetts, USA (www.draper.com), and described, for example, in U.S. Pat. Nos. 5,767,405 and 7,043,985, each of which is incorporated herein in its entirety by reference. An example of a basic tuning fork MEMS gyroscope, shown in FIG. 2, includes a pair of masses driven to oscillate with equal amplitudes but in opposite directions. Rotation of the gyroscope about an in-plane axis of sensitivity lifts the moving masses, which is detected with capacitive electrodes positioned under the masses.

Analog Devices Inc. of Norwood, Mass. offers a number of integrated angular-rate sensing gyroscopes (see, for example, Geen et al., "New iMEMS® Angular-Rate-Sensing Gyroscope", Analog Dialog, Vol. 37, March 2003, available at http://www.analog.com/library/analogDialogue/archives/37-03/gyro.html, which is hereby incorporated herein by reference in its entirety). Some exemplary MEMS gyroscopes are described in U.S. Pat. Nos. 6,877,374, 7,089,792, 7,032,451, 7,204,144, 7,357,025, and 7,216,539, each of which is hereby incorporated by reference in its entirety. In such gyroscopes, capacitive silicon sensing elements are interdigitated with stationary silicon beams attached to a substrate that are used to measure a Coriolis-induced displacement of a resonating mass.

Another family of MEMS-based inertial sensors known in the art includes vibrating-wheel gyro structures, schematically illustrated in FIG. 3. These structures generally have a wheel driven to vibrate about its axis of symmetry, where rotation about either in-plane axis results in the wheel's tilting, a change that can be detected with capacitive electrodes under the wheel. Yet another emerging MEMS-implementation is a ring gyroscope, where a planar resonant Si-based ring structure is driven to resonance and the position of its nodal points indicate the rotation angle. An example of a ring gyroscope shown in FIG. 4 was developed at the University of Michigan (see, e.g., F. Ayazi and K. Najafi, "Design and Fabrication of A High-Performance Polysilicon Vibrating Ring Gyroscope", Eleventh IEEE/ASME International Workshop on Micro Electro Mechanical Systems, Heidelberg, Germany, Jan. 25-29, 1998; F. Ayazi and K. Najafi, "High aspect-ratio combined poly and single-crystal silicon (HARPSS) MEMS technology", J. of Microelectromechanical Systems, v. 9, pp. 288-294, 2000; F. Ayazi and K. Najafi, "A HARPSS Polysilicon Vibrating Ring Gyroscope", Journal of Microelectromechanical Systems, Vol. 10, No. 2, June 2001). In such ring gyroscopes, a poly-Si ring resonator is driven by drive and control electrodes to vibrate about its axis of symmetry, and rotation of the chip that carries the gyroscope results in a ring displacement that can be detected by capacitance-sensing elements through the change in geometry of capacitive air-gaps.

As would be appreciated by one skilled in the art, currently employed micromachining processes are not particularly compatible with widely used standard CMOS processes such as reactive-ion etch (RIE) or electron-beam milling. Such incompatibility lengthens and complicates fabrication cycles and increases the cost of the resulting MEMS-based devices. In addition, current MEMS-based solutions for inertial sensors quite often employ capacitive driving and sensing structures, such as drive and control electrodes of FIG. 4. The capacitive nature of operating a conventional inertial sensor imposes, among other requirements, a need for an air-gap between an oscillating mass (the ring in FIG. 4) and an electrode. The air-gaps of MEMS structures are clearly susceptible to contamination with microparticles (during both the manufacturing process and operation) that may permanently incapacitate inertial sensors devices. Moreover, an electrostatically driven mass or ring in such devices is susceptible to anomalies in charge distribution across a set of driving and sensing electrodes. In vibrating gyroscopes, the non-uniform charge distribution can contribute to an offset drift and reduce the accuracy and precision of these devices or even nullify their performance.

SUMMARY OF THE INVENTION

Embodiments of a piezoelectric transducer of this invention permit transferring energy, through piezoelectric effect, between electrostatic energy associated with voltage differential between the top and bottom electrodes of the transducer and mechanical energy associated with deformation of frames of the transducer. In one embodiment, the transducer of the invention comprises a structure made of piezoelectric material that includes a set of substantially flat elongated concentric frames connected by bridges disposed symmetrically about a plane of symmetry of the structure. Such bridges allow the frames to deform in a reference plane which is substantially parallel to top and bottom surfaces of the frames. A set of at least two top electrodes is disposed on the top surfaces of the frames. A set of at least two corresponding bottom electrodes is disposed on the bottom surface of the frames opposite to the first set. Both the top and the bottom set of electrodes are disposed on at least two frames along a path that is symmetric about the plane of symmetry of the structure and crosses some of the bridges. Some of these electrodes may be used to apply a voltage differential between the top and bottom surfaces of the piezoelectric transducer, while some of the electrodes may be configured to sense the changes in motion of the frames of the transducer based on a voltage differential associated with such changes. In some embodiments, the deformation of the frames may be reciprocating, and may be characterized by amplitude that is higher in central portions of the frames than in peripheral portions of the frames.

Related embodiments of the invention provide for a motion sensor including the piezoelectric transducer of the invention coupled with a resonator that may move substantially in the reference plane. Such motion sensor may be used as an inertial sensor, for example accelerometer or a gyroscope. In some embodiments, the transducer may cause the motion of the resonator. In alternative embodiments, the transducer may sense the motion of the resonator. In addition, the transducer may be configured to enable detection of charges in electric field arising, through piezoelectric effect, from changes in the motion of the resonator that are associated with rotation of the body of the motion sensor. In related embodiments, the body of the transducer may be reflectionally symmetric about the axis that is normal to the reference plane and be affixed to and above a surface of a substrate using a set of anchors, where at least one anchor may be positioned proximate to the body's center of mass. Such anchors are configured to allow movement of the body relative to the substrate. Alternatively, the body of the transducer may be affixed to the substrate within a recess formed in the substrate. In yet further embodiments, the body of the sensor may comprise hub and ring portions, where the ring portion may be supported by spokes extending substantially in radial direction from the hub portion and where the deformation of the frames of the piezoelectric transducer may be transferred to the ring along the spokes. The hub and the ring portions of the sensor may be circular or may be generally shaped otherwise.

In addition, the invention provides a method of sensing a movement of the embodiments of the inertial sensor of the invention with the use of the piezoelectric effect by sensing changes, within the local reference system, to the reciprocating motion of the frames of the transducer based on a voltage differential arising between the top and bottom sensing electrodes. Such changes in the reciprocating motion are indicative of a rotation of the inertial sensor about an axis that is perpendicular to the plane of motion of the frames.

Furthermore, embodiments of the invention provide for method for modifying an oscillation of a resonator in an inertial sensor. Such modification includes disposing piezoelectric compensators substantially equidistantly among the driving and the sensing piezoelectric transducers of the inertial sensor so as to form gaps between the corresponding compensators and the resonator of the sensor, and measuring changes in charges stored in capacitors associated with changes in capacitive gaps due to the oscillation of the resonator. In addition, the method comprises a step of modifying the stored electrostatic charges so as to affect the oscillation of the resonator, for example, to adjust its resonant frequency. In specific embodiments, such modification of charges may include equalization of the changes in the stored charges among the capacitors.

BRIEF DESCRIPTION OF THE DRAWINGS

The foregoing features of the invention will be more readily understood by reference to the following detailed description, taken with reference to the accompanying drawings, in which like elements are annotated with like labels and numbers and in which:

FIG. 5 illustrates a piezoelectric principle of general operation of embodiments of the invention, wherein

FIG. 6 schematically shows an inertial sensor having a ring resonating structure attached to the central hub with the spokes in accordance with an exemplary embodiment of the present invention, wherein

FIG. 7 schematically depicts, in top view, two-fold-symmetry modes of oscillation of an embodiment of a ring resonator.

FIG. 8 schematically shows a MEMS-based inertial sensor having two-fold symmetry in accordance with an exemplary embodiment of the invention, wherein

FIG. 9 depicts an exemplary frame structure of a piezoelectric transducer in accordance with an exemplary embodiment of the invention, wherein

FIG. 12 schematically shows a deformation of the transducer of FIG. 10 caused by the field of alternating polarity of FIG. 11 being applied to the frame structure of the transducer, wherein FIG. 12A shows a view in which a spoke is pushed outward with respect to the hub as a result of applying the field of FIG. 11A and FIG. 12B shows a view in which the spoke is pulled towards the hub as a result of applying the field of FIG. 11B;

FIG. 14 schematically illustrates exemplary MEMS-based devices comprising embodiments of inertial sensors of the invention, wherein

DETAILED DESCRIPTION OF SPECIFIC EMBODIMENTS

Embodiments of the present invention describe piezoelectric transducers and inertial sensors such as gyroscopes and accelerators utilizing such piezoelectric transducers. The described embodiments utilize the piezoelectric effect both to generate oscillations of their resonators and to sense the changes in such oscillations produced, in the sensors' frames of reference, by Coriolis forces appearing due to the movement of the sensors. In specific embodiments, the movement may be a rotational movement.

As used in this description and the accompanying claims, the following terms shall have the meanings indicated, unless the context otherwise requires:

A term "set" refers to either a unit or a combination of multiple units.

"Electrostatic energy," as understood in the art, generally refers to the potential energy which a collection of electric charges possesses by virtue of their positions relative to each other. For example, the energy, stored in an electric capacitor after its separated conducting plates have been charged, is electrostatic.

A "piezoelectric effect," conventionally related in the art to generation of electric potential in response to mechanical stresses applied to a piezoelectric material, and a "converse piezoelectric effect," conventionally associated with formation of material stresses or strains when an electric field is applied to such material, are used interchangeably herein and should be understood to generally refer to transduction between the electrostatic energy and the mechanical energy in a piezoelectric material subjected to either electrostatic or mechanical influence.

"Body" refers to a representation of a physical structure and material substance in a bodily form.

An electric field applied across a piezoelectric body is considered to be "alternating" when the field is changed repeatedly between two different states that generally manifest in different effects on the shape of the piezoelectric body. Consequently, reciprocating the applied electric field between the static vector values of +E and −E (i.e., changing the field polarity with a use of a switch, for example), which for some piezoelectric material may correspond to expansion and contraction of the material, will be understood as "alternating" the electrostatic field applied to such material. Similarly, switching the static field applied to a piezoelectric material between the values of E and zero (which may respectively correspond to the state where the material experiences mechanical stresses and the state in which material is not piezoelectrically deformed) is also understood as "alternating" the applied field.

Figure 1:
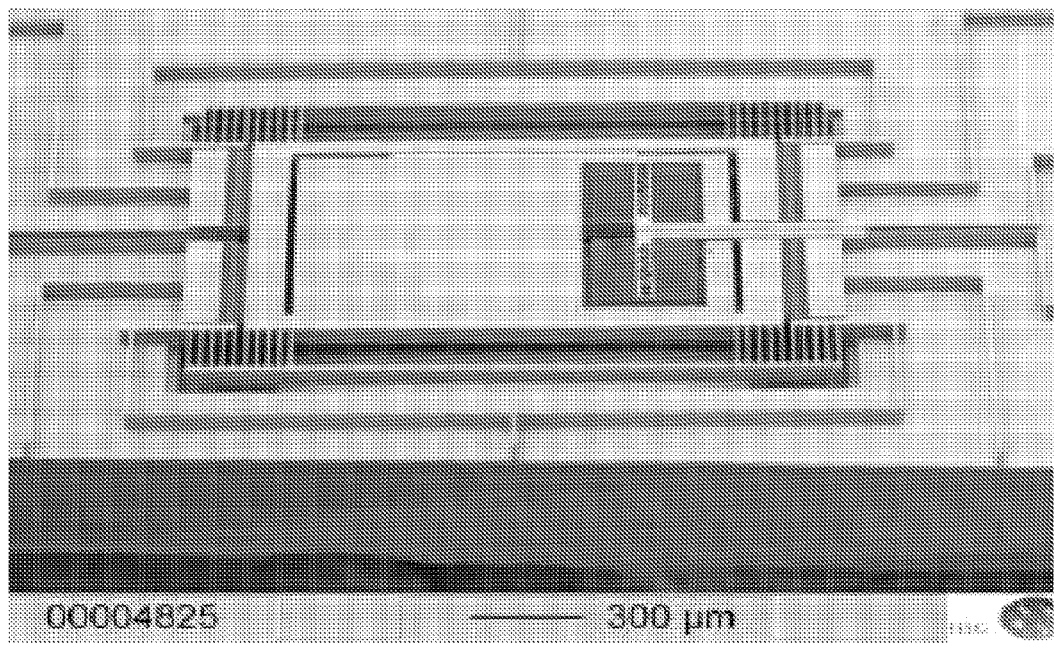
FIG. 1 shows a linear resonator gyroscope of the prior art.
Figure 2:
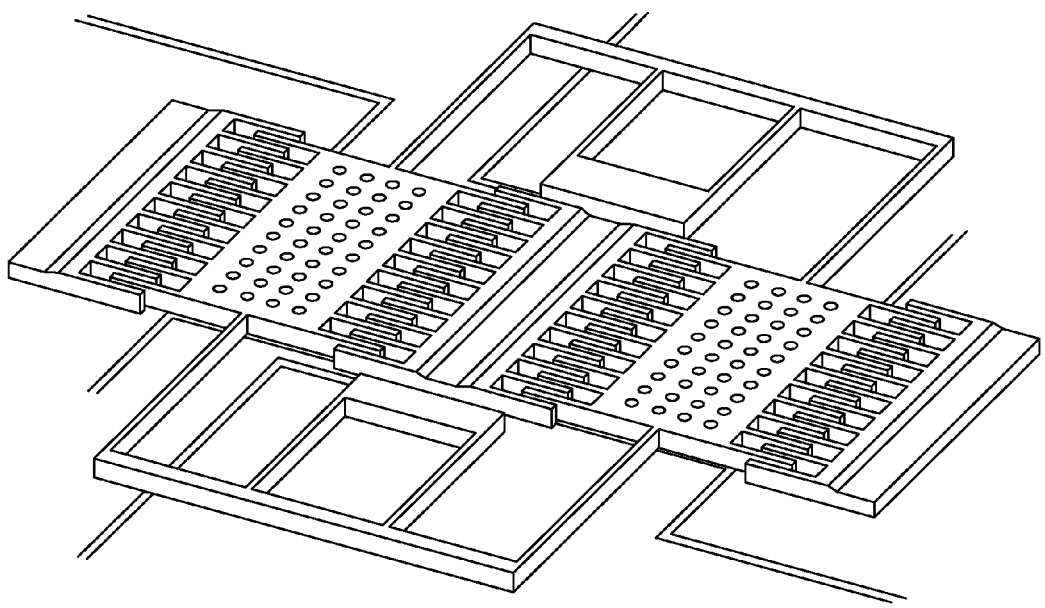
FIG. 2 shows a comb-drive tuning fork MEMS gyroscope of the prior art.
Figure 3:
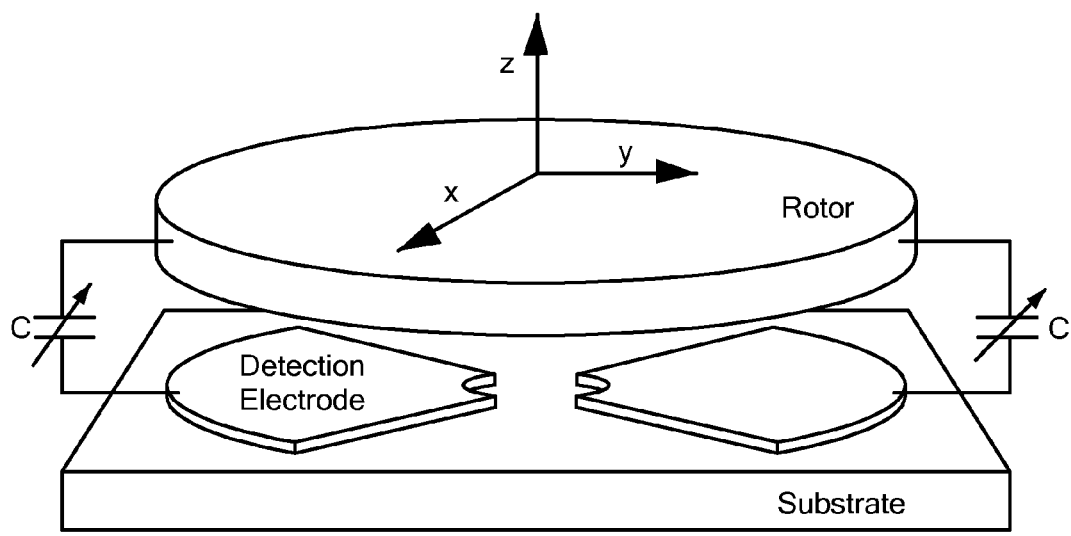
FIG. 3 schematically illustrates a prior art concept of a vibrating-wheel MEMS gyroscope.
Figure 4:
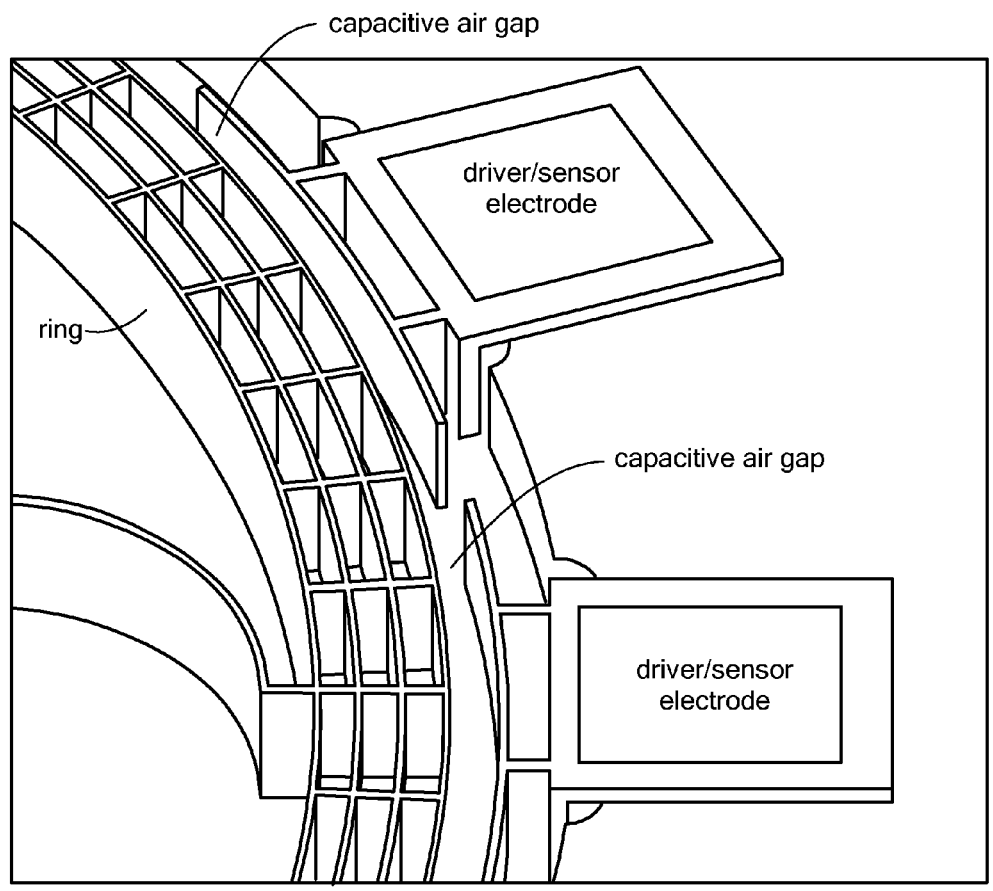
FIG. 4 shows a poly-silicone ring gyroscope of the prior art.
Figure 5A:
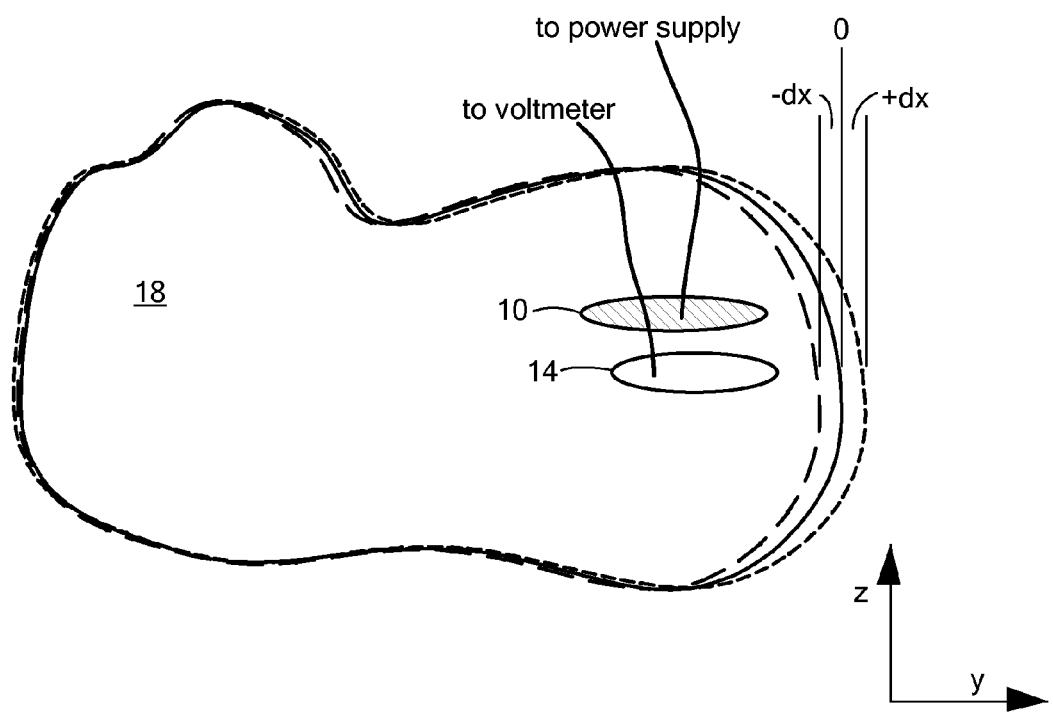
FIG. 5A shows a top view and FIG. 5B shows a side view.
Figure 5B:
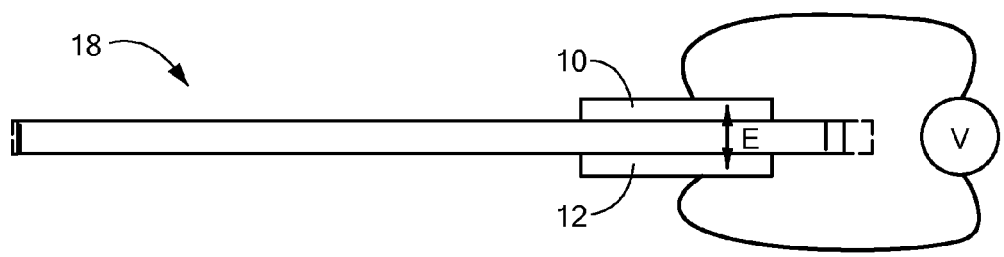

FIG. 5 schematically illustrates, in top and side views, a principle according to which an inertial piezoelectric sensor of the present invention is realized. This principle applies equally to a gyroscope, an accelerator, or any other type of inertial sensor contemplated by the invention. As shown in FIG. 5A, two electrodes—a driving electrode 10 and a sensing electrode 14—are disposed on the top surface of a substantially flat body 18 having substantially constant thickness of piezoelectric material. Another pair of electrodes, comprising a driving electrode 12 and a sensing electrode 16 that respectively correspond to the electrodes 10 and 14, is disposed on the bottom surface of the body 18 and is not visible in the top view of FIG. 5A. For the sake of simplicity, the side view of FIG. 5B shows only the driving electrodes 10 and 12. When connected to a power supply, the driving electrodes create an electric field E across the body 18 thus causing the body to expand or contract through a well-understood in the art piezoelectric effect. If the applied direct-current electric field E is alternated, the resulting transduction of electrostatic energy to mechanical energy of deformation of the body alternates as well. In this case, the expansions and contractions of the body 18 reciprocally shift its boundary, e.g., by incremental amounts +dx and −dx as indicated in FIG. 5, due to alternating mechanical stresses generated across the body. As will be understood by one skilled in the art, a detection of rotation—if present—of the body 18 experiencing reciprocating mechanical expansion and contraction can be enabled by the second pair of sensing electrodes 14 and 16, through the piezoelectric effect. An appropriate measuring device such as voltmeter (not shown), for example, connected to this second pair of electrodes 14 and 16 will register a change in an electrostatic charge, generated in the vicinity of the electrodes due to apparent variation in body's deformation caused by rotation of the body, in accordance with the Coriolis effect. Such registration of the change in the electrostatic charge practically amounts to sensing the presence of and measuring the Coriolis effect and, therefore, the rotational motion of the body itself. The strength of the energy transduction, and therefore the sensitivity of sensing the rotational motion, depends on physical characteristics of the body 18, such as piezoelectric coefficients and mass. It should be noted that, to this end, any pair of electrodes—whether a pair (10,12) or a pair (14,16)—may be used as either driving or sensing electrodes at the user's discretion, in an exemplary embodiment.

Figure 6A:
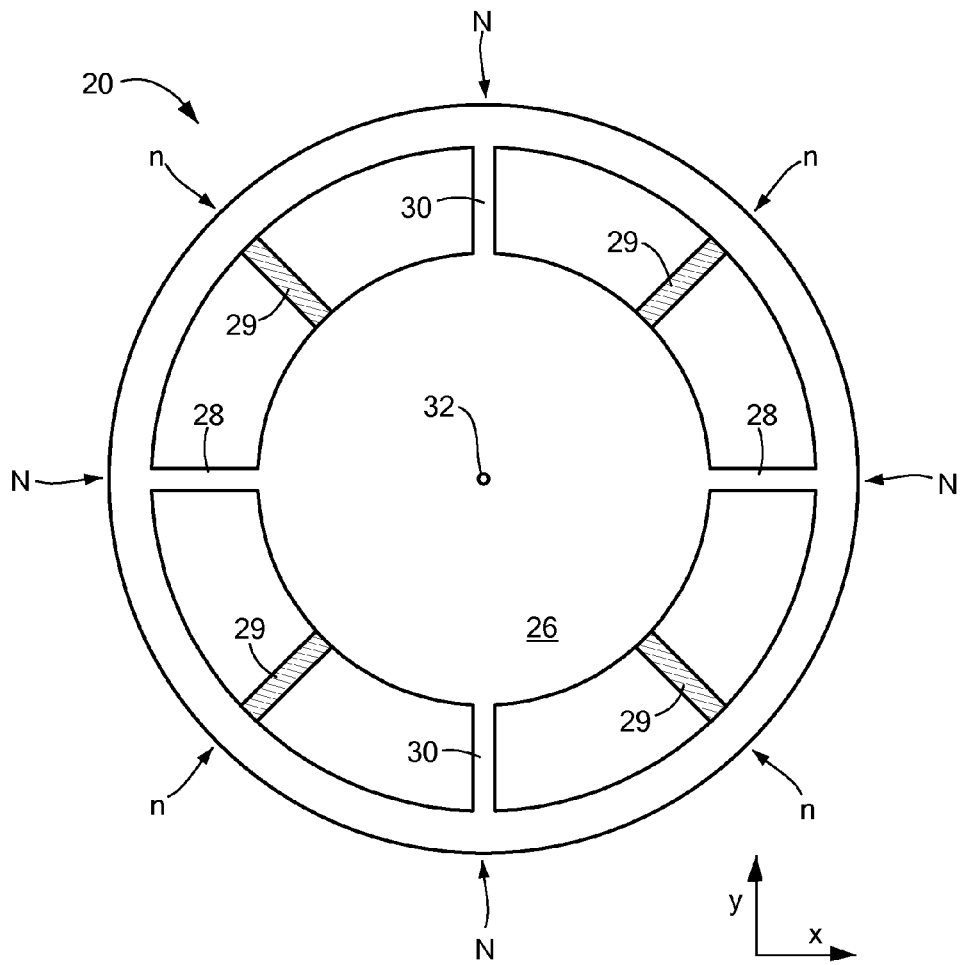
FIG. 6A shows a top view and FIG. 6B shows a side view.
Figure 6B:
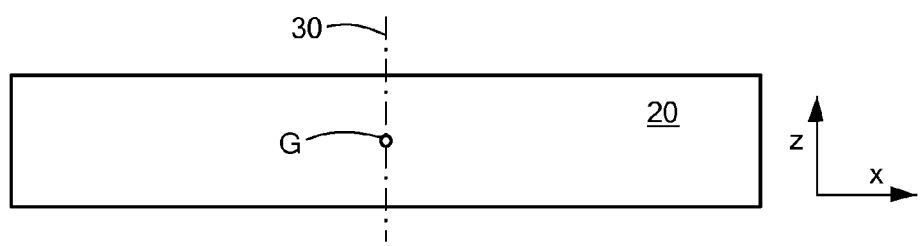
Figure 7A:
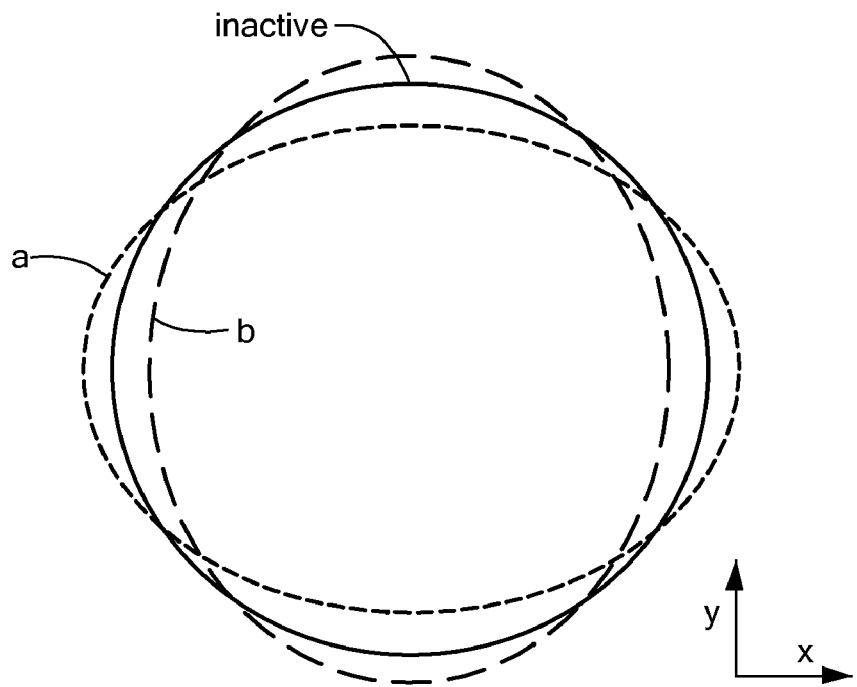
FIG. 7A shows deformations of the spoke-driven regions of the ring.

In some related embodiments, to increase the sensitivity and isotropy of sensing the rotational motion, the body of the piezoelectric sensor may be configured in a circular fashion. Moreover, in a specific embodiment, such as that shown in FIG. 6 in top and side views, a body 20 of the sensor may feature a ring resonating structure 24, suspended on the outer side of a centrally positioned hub 26. (It should be noted that a different, internal positioning of a ring resonating structure with respect to the heavier, outer portion of the body 20 may also be realized. However, as discussed below, such alternative positioning is likely to subject the resulting piezoelectric sensor to errors during performance due to structural offsets and variation of fabrication processes.) As shown in FIG. 6, the hub 26 is connected to the ring 24 with spoke-like support structures 28 and 30. In this specific embodiment, the body 20 is shown to be reflectionally symmetric with respect to a normal 32 passing through a center of gravity G of the body. However, such reflectional symmetry is not generally required. The spokes 28 and 30 generally may be of any shape, whether straight or curved, may be continuous, or may comprise several pieces. It would be understood that reciprocating force transferred to the ring 24 along the spokes 28 may generate a vibrational in-plane oscillation of the ring (interchangeably referred to herein as mode or resonating mode). For example, periodic expansion and contraction of the ring forced by periodic expansion and contraction of the spokes 28, operating simultaneously along the x-axis, with the spokes 30 remaining idle, will result in a substantially elliptical mode of the ring oscillating along the x-axis. An out-of-phase addition of an equivalent expansion and contraction of the spokes 30 to such movements of the spokes 28 will extend the oscillation of the ring to the y-axis as well, resulting in an oscillating mode possessing a two-fold symmetry, as shown in FIG. 7A in top view. Here, a solid line indicates the geometry of the ring 24 in its inactive state, a dashed ellipse a corresponds to an extremal extension of the ring along the x-axis, driven by the extension of the spokes 28 in the x-axis and contraction of the spokes 30 in the y-axis of FIG. 6A, and a dashed ellipse b illustrates an extremal extension of the ring along the y-axis, driven by the extension of the spokes 30 in the y-axis and contraction of the spokes 28 in the x-axis of FIG. 6A. In general, any reciprocating mechanical expansion and contraction of the spokes 28 and 30 may be realized, according to the embodiments of the invention, with the use of the piezoelectric effect by applying an alternating electrostatic field to the piezoelectric spokes 28 and 30 of the body 20.

Figure 7B:
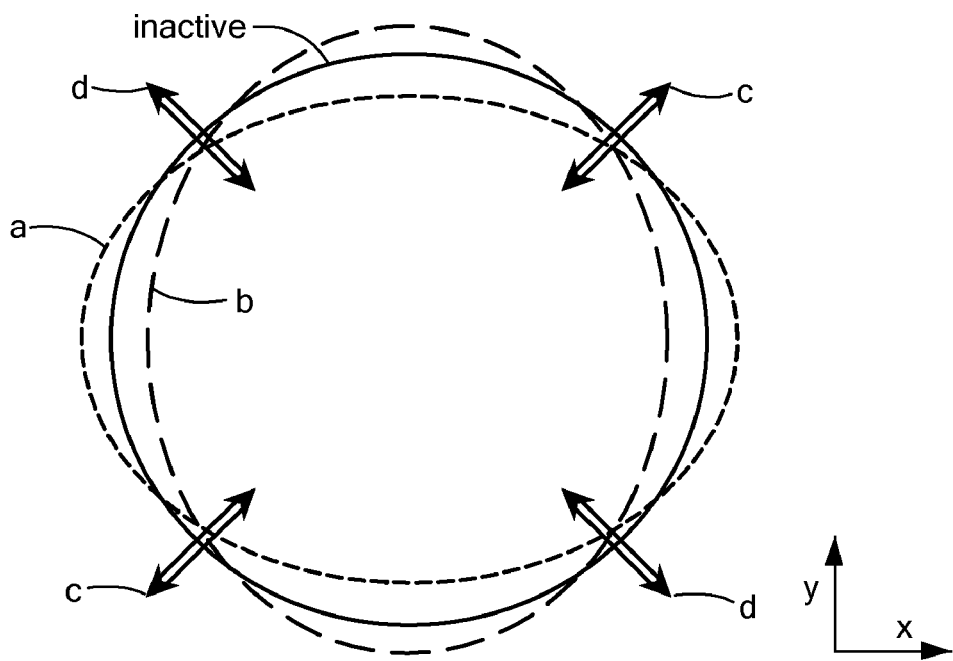
FIG. 7B shows deformations of the sensing regions of the ring located between the driving spokes.

As would be understood by a person skilled in the art, both the deformation and the resulting oscillatory motion of intermediate regions n, of the ring 24 of FIG. 6A, located between the spoke-driven regions N (i.e., at substantially 45-degree angles with respect to the x- and y-axes) are essentially out of phase with respect to the deformation and the oscillatory motion of the spoke-driven regions. The deformation of the spoke-driven regions N would cause some deformation of the intermediate regions n whether these intermediate regions are suspended, with respect to the hub 26 without any direct physical connection to the hub 26 or are directly attached to it with another, intermediate set of connectors (not shown in FIG. 6A). When such deformations of the intermediate regions are periodic, they may be viewed as oscillatory modes, schematically shown in FIG. 7B with arrows c and d. Generally, the amplitude of deformation of the intermediate regions may differ from that of the spoke-driven regions N. Such deformation of the intermediate regions n will change, in the local system of coordinates, should the body 20 be experiencing a rotational motion. Therefore, certain embodiments of the current invention utilize the change in oscillatory modes c and d of the intermediate regions n of the ring for sensing a rotational motion, experienced by the inertial sensor of the invention through piezoelectric effect, as discussed below. In specific embodiments, such sensing may be performed by sensors 29 connecting the hub 26 to the intermediate regions n of the ring 24 as shown in FIG. 6A.

Figure 8A:
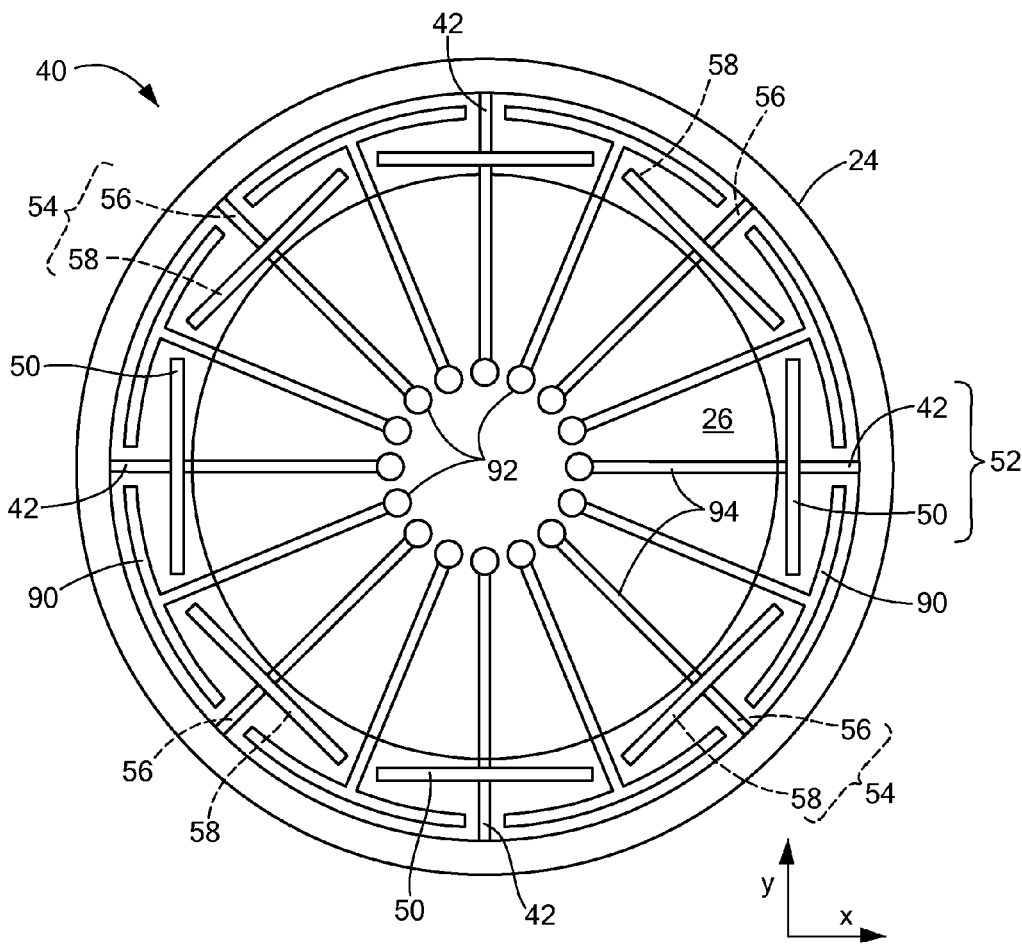
FIG. 8A shows a top view and FIG. 8B shows a side view.
Figure 8B:
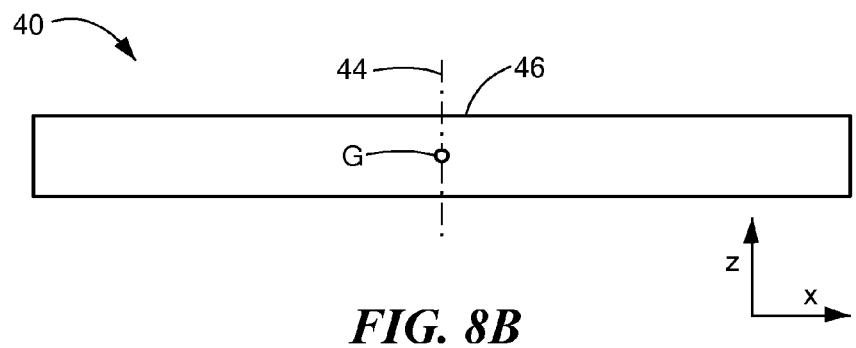

FIG. 8 illustrates top and side views of a body 40 of a MEMS embodiment of an exemplary inertial sensor system that possesses a two-fold operational symmetry. Such inertial sensor may be a gyroscope, an accelerometer, or another motion-sensing inertial device. FIG. 8A shows detailed implementation of the embodiment of FIG. 6A, in top view. The body 40 is made of piezoelectric material such as, for example, aluminum nitride (AlN). Here, the ring-resonator 24 is suspended with respect to the hub 26 of the body 40 with a set of four spoke structures 42 and another set of four spoke structures 56, each of which connects the hub and the ring. All the spokes extend radially and outwardly with respect to the hub and are disposed reflectionally symmetrically about a symmetry axis 44, which is perpendicular to the body's top surface 46 and passes through the center of gravity G of the body. A set of four transducers 50 discussed below may be integral with the respective spokes 42 and, in combination with these spokes, may form driving elements 52. Similarly, four sensing elements 54 are symmetrically disposed in the areas intermediate to the driving elements 52. Each of the sensing elements 54 comprises a spoke 56 and a transducer 58 that may be substantially equivalent to the spoke 42 and transducer 50 of the driving elements 52.

Generally, an embodiment of a transducer of the invention may be configured as a set of slabs or frames of piezoelectric material sandwiched between appropriately structured pairs of electrodes that are configured to either apply an electric field to the material of the transducer or register the electrostatic charge (accumulated on the opposite sides of the frames) and potential (originating across the material). In some embodiments, the frames of piezoelectric material comprising the transducer may be disposed concentrically, as discussed below. When a periodically alternating electric field is applied to the material of any transducer 50, the transducer deforms, in oscillating fashion, and a corresponding spoke 42 to which the transducer is connected. Consequently, the regions of the ring 24 adjacent to the spokes 42 are spoke-driven and periodically deformed, and the ring is engaged to oscillate in a two-fold-symmetry resonating mode similar to that shown in FIGS. 7A and 7B. The intermediate regions of the ring, which are connected to the hub 26 by the four sensing-element spokes 56, transfer, in turn, such oscillating motion to the respective sensing transducers 58 that register an electrostatic charge accumulating at the opposite sides of the transducer material due to the piezoelectric effect. If, in the process of ring-oscillation, the body of the inertial sensor 40 is subjected to a rotational motion, the Coriolis effect changes the modal shape of the ring deformation in the local coordinate system associated with the inertial sensor, and the sensing elements 54 register the change in the electrostatic charge associated with the rotation. As will be readily understood by a skilled artisan, both driving and sensing elements of the embodiments of the present invention can be structured substantially equivalently and, therefore, perform either a driving or sensing role depending on the user's choice. However, deliberate differences introduced between the embodiments of a driving and sensing elements at user's discretion do not affect the principle of operation of the embodiments and are within the scope of the invention.

Figure 9A:
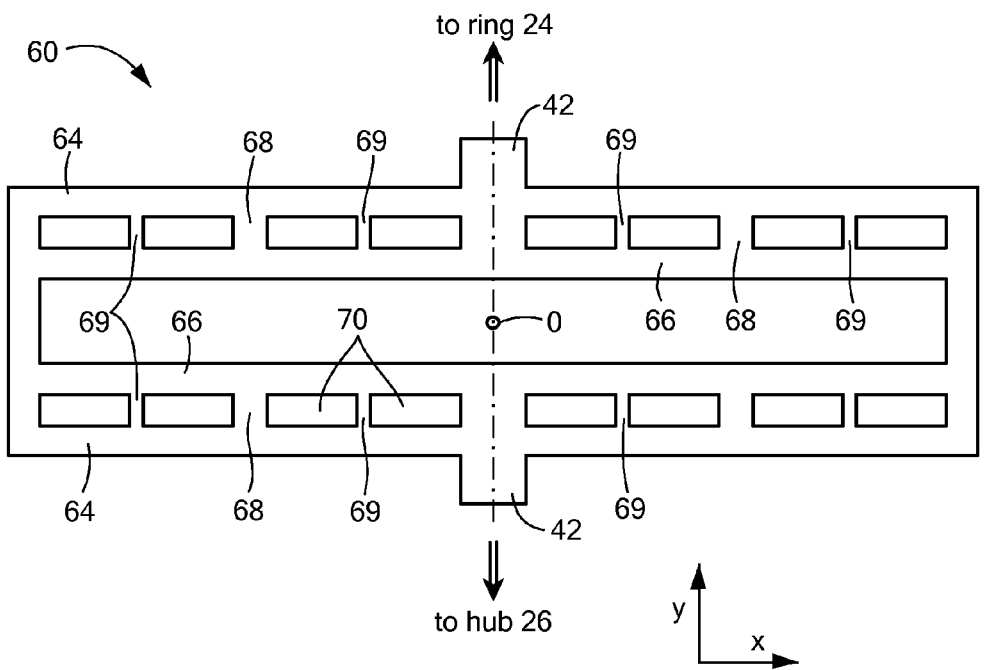
FIG. 9A shows a top view and FIG. 9B shows a side view.
Figure 9B:
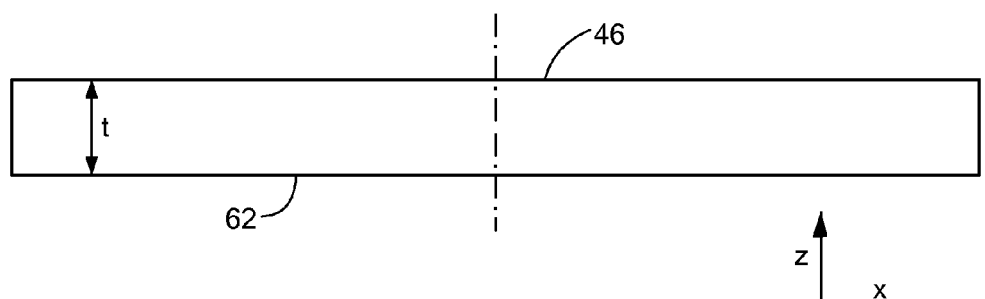
Figure 10:
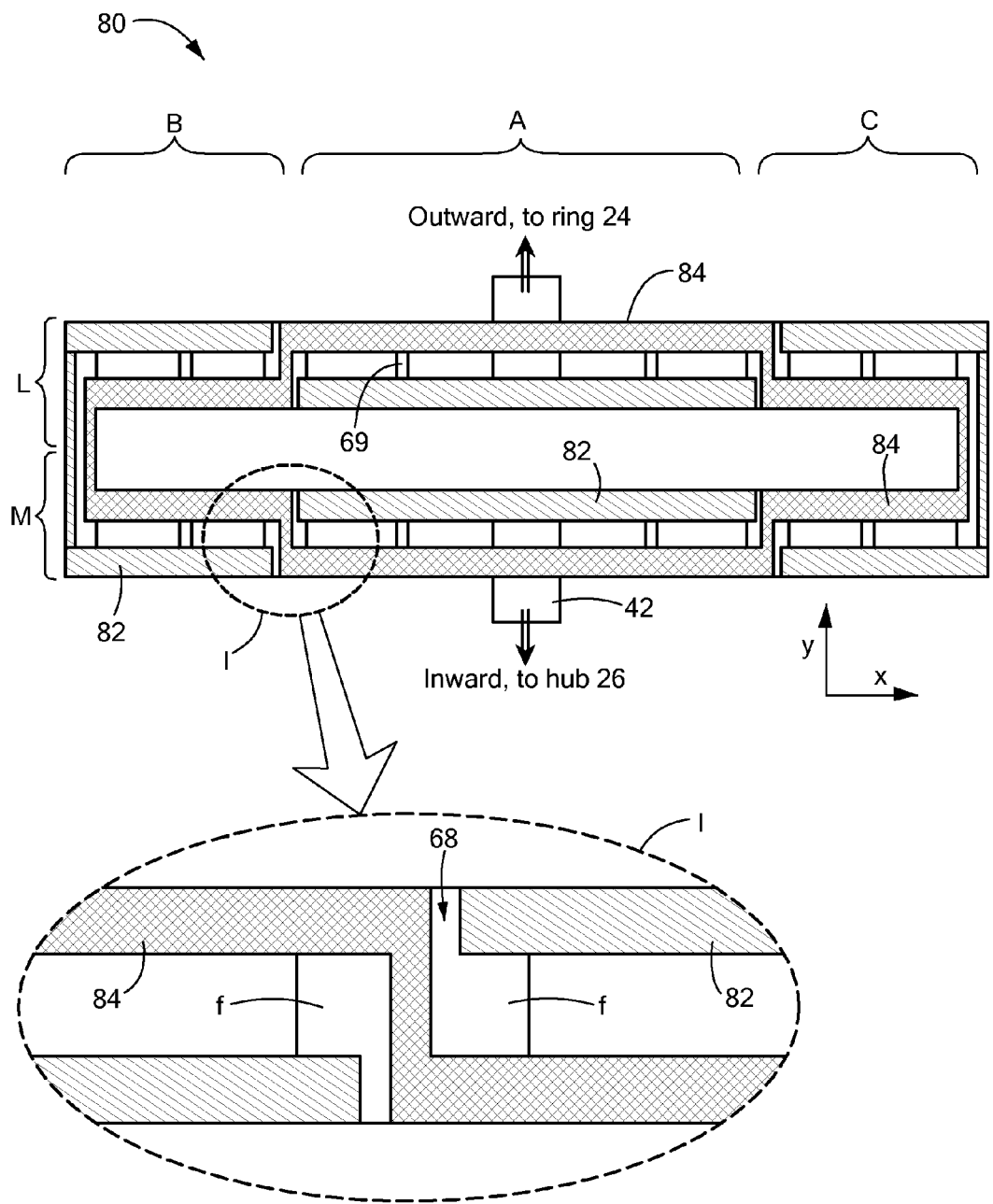
FIG. 10 depicts, in top view, an electrode pattern formed on the frame structure of FIG. 9 including a close-up view of a portion of the electrode pattern, in accordance with an exemplary embodiment of the invention.

Configuration of transducers is further discussed with reference to FIGS. 9 and 10, illustrating some exemplary embodiments, with continuing reference to FIG. 8. Although the transducer operation is described below with reference to the driving transducers 50 of FIG. 8, the same description is equally applicable to the sensing transducers 58. FIG. 9A shows, in top view, a piezoelectric frame structure 60 of a transducer 50. As shown, the piezoelectric frame structure is elongated along x-axis, i.e. laterally with respect to a spoke 42 that connects the ring 24 of the gyroscope 40 to the hub 26. FIG. 9B offers a corresponding side view. The structure 60 is characterized by a substantially constant thickness t defined by the top and bottom substantially flat surfaces 46 and 62 that are parallel to a reference plane (the xy-plane in FIG. 9). Although the frame structure 60 is shown to possess two-fold symmetry (about the yz- and xz-planes, each of which is a plane of symmetry of the embodiment 60), it should be appreciated that, in general, such symmetry is not required for operation of the device. For example, an embodiment of a frame structure may be configured to be symmetric only about a single plane of symmetry of the structure. As shown in FIGS. 9A and 9B, the frame structure 60 comprises a set of two frames—an outer frame 64 and an inner frame 66—both of which have substantially equal thicknesses t, are elongated along the x-axis, have a common center O (i.e., are disposed concentrically with respect to the center O), and are interconnected with piezoelectric bridges 68. The frame configuration of FIGS. 9A and 9B may allow for a selective and independent deformation in the xy-plane of at least some portions of the frames 64 and 66. An example of such deformation may be bending of at least a portion of a frame, induced by the piezoelectric effect. As will be understood from the following discussion, the bridges 68 facilitate flexing of the frames. In an alternative embodiment, a frame structure may be configured without at least some of gaps 70 between the frames, or contain more than two frames. Neither variation, however, changes the principle of operation of the device. An embodiment of the frame structure such as the structure 60 of FIG. 9 is generally fabricated from a piezoelectric material, for example AlN, with conventional micromachining and lithographic methods used in semiconductor industry such as, for example, reactive-ion etch (RIE) or electron-beam milling. The use of conventional methods of fabrication lends the resulting device to production on a mass, cost-effective scale that is compatible with Si-integration technologies. To complete the fabrication of a transducer, either frames, or bridges, or both may contain through-hole vias for appropriately providing electrical interconnections among the sets of electrodes that are further deposited on the frame structure, as shown in FIG. 10.

To utilize the piezoelectric principle of operation of the transducer, two substantially equivalent sets of electrodes—a set of top electrodes and a corresponding set of bottom electrodes, each set including at least two electrodes—may be configured opposite to one another on the top and bottom surfaces of the frame structure, respectively, so as to facilitate the application of electric field to the frame structure. Referring now to FIGS. 9 and 10, FIG. 10 displays an embodiment 80 of a transducer having a two-frame structure 60 of FIG. 9. The embodiment 80 has a set of two top electrodes 82 and 84, deposited on the top surface 46 of the frame structure, and a corresponding set of two bottom electrodes 82' and 84' (not shown) deposited on a bottom surface 62. Each of the top electrodes (and, respectively, each of the bottom electrodes) is configured along a particular path that is symmetric with respect to at least one plane of symmetry of the frame structure and includes portions of both the frames 64 and 66 of FIG. 9A. It should be noted that in embodiments comprising more than two frames, each of the electrode paths may be configured to access at least two frames. To pass from one frame of the structure to another, a corresponding electrode is configured to cross one of the bridges 68 either along a corresponding surface (top or bottom) of the frame structure or through a via created in that bridge. For example, as shown in insert I of FIG. 10, the top electrode 84 may be deposited over a central portion of a bridge 68 while the top electrode 82 maintains its continuity through a via (not shown) in the bridge 68. Both of the top electrodes are configured to at least partially overlap with the top surface of the bridge 68, keeping, at the same time, portions f of the bridge exposed. The corresponding bottom electrodes are configured substantially equivalently. The bridges of the transducer that are crossed by the paths of electrodes generally define one central and several peripheral transducing sections. Each of the transducing sections may include one or more elements connecting the frames, such elements not covered with electrodes. Such optional connecting elements, which are shown in FIG. 9A as elements 69, are mainly used for stiffening of the frame structure. Overall, the embodiment 60 of FIG. 9A comprises four bridges 68 and eight connecting elements 69. Although, as shown in FIG. 10, regions L and M of the transducer 80 (L being the outer region and M being the inner region with respect to the hub 26) are characterized by three sections—central section A and two peripheral sections B and C—more than two peripheral sections may be formed at the user's discretion. The electrodes may be fabricated of platinum (Pt) or any other suitable material using appropriate lithographic methods known in the art.

Figure 11A:
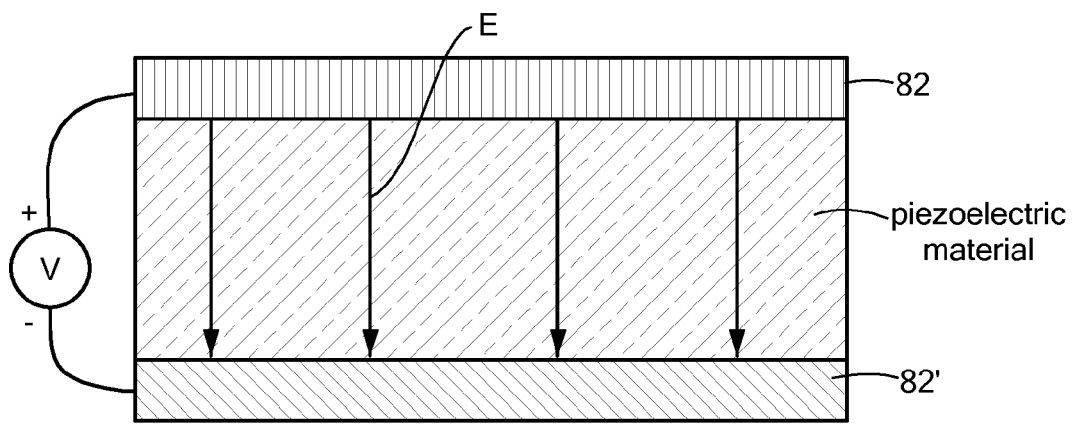
FIG. 11 shows a cross-section of the embodiment of FIG. 10 with an applied electric field E of a polarity that alternates between the states of FIGS. 11A and 11B.
Figure 11B:
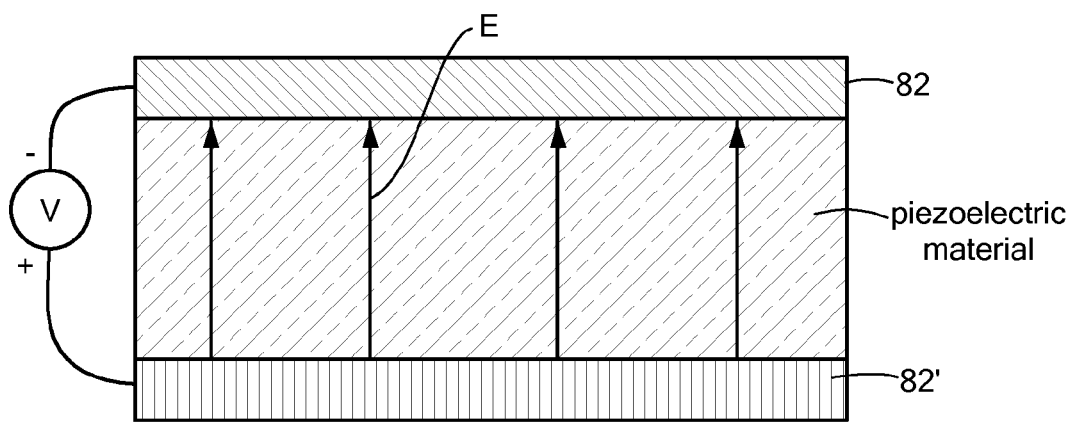

It should be appreciated that a transducer of the invention can operate as part of either a driving element, generating an in-plane mode of oscillation of the ring of the inertial sensor as discussed above in reference to FIG. 7, or as part of a sensing element. The operation of a driving transducer of the invention is further discussed in reference to FIGS. 11 and 12, with continuing reference to FIG. 10. FIGS. 11A and 11B schematically illustrate, in side views, a cross-section of a portion of the frame of the embodiment 80 of FIG. 10 with a an electric potential of cyclically alternating polarity applied between the top electrode and the corresponding bottom electrode (in this example, the electrodes 82 and 82') that sandwich the frame comprised of the piezoelectric material. The instantaneous electrostatic field, associated with the potential difference applied between the electrodes, is denoted as E. It should be appreciated that, to enhance the driving operation of the transducer 80, the polarity of a potential applied to another electrode pair (84, 84') may be varied out-of-phase with that applied to electrodes 82 and 82'.

To configure the transducer 80 as a driving transducer, in the first half of the cycle, the polarity of electric field E provided between the electrodes 82 and 82' may be chosen, for example, to expand the piezoelectric material sandwiched between the electrodes, as shown in FIG. 11A. At the same time, the polarity of a non-zero field between the electrodes 84 and 84' may be chosen to be out of phase with E to contract the corresponding material. (Alternatively, no field may be applied between the electrodes 84 and 84', in which case the portion of the material sandwiched by these electrodes does not experience any externally caused mechanical stress.) A cumulative piezoelectric effect produced by the fields affecting the corresponding portions of the frame structure as described will result in effective bowing of the sections A, B, and C (in both the outer region L and the inner region M of the transducer 80 of FIG. 10) outwardly with respect to the center point O of the frame structure. In this deformation, the bridges 68 connect sections B and A and sections C and A, so as to effectively add the deformations of the sections B and C to the deformation of the section A. Deformations of the sections generally may be substantially equal and, when added together, increase the overall outward/inward deformation. Consequently, the amplitude of the deformation of the central section A is generally higher than those of the peripheral sections. FIG. 12A illustrates the described deformation of the frame structure of the transducer 80 that pushes a portion of the spoke 42 and, therefore, a rigidly attached portion of the ring 24, outwards and away from the hub. For the purposes of comparison, a neutral position and geometry (i.e., the geometry corresponding to no field applied) of the frame structure of the transducer is indicated with a dashed line.

In the second half of the cycle, the polarities of the fields between the pairs of electrodes (82, 82') and (84, 84') reverse, as shown in FIG. 11B for the pair of electrodes 82 and 82', and the frame structure of the transducer consequently bows inward with respect to the center point O, as shown in FIG. 12B. As a result, the bowing frame structure pulls the portion of the ring 24, to which it is attached by the spoke 42, towards the hub 26. Accordingly, the appropriate periodic cycling through the change of polarity of the potentials, applied out-of-phase to the corresponding pairs of the top and the bottom electrodes of the transducer 80, results in generating an in-plane oscillating mode, of the ring 24 of the inertial sensor 40 of FIG. 8, similar to that shown in FIGS. 7A and 7B. It would be understood, however, that the out-of-phase application of the field (and, therefore, a potential differential) between both abovementioned pairs of electrodes is not generally required for the operation of the device. In a related specific embodiment, for example, the ring 24 may be driven by a potential reversal between only one pair of the electrodes—either (82, 82') or (84, 84').

As would be understood by one skilled in the art, the same transducer in an embodiment of the inertial sensor may operate as a sensing transducer. Such sensing performance may be realized when a difference of potentials between the electrodes of the transducer (such as electrodes 82, 82' or 84, 84' of the embodiment 80 of FIG. 10) is piezoelectrically generated in response to the expansion and contraction of the transducer's frame structure compelled by the in-plane oscillation (indicated as a and b in FIGS. 7A and 7B) of the ring 24. According to one embodiment of the invention, the user has discretion to decide which transducers of the plurality of the transducers of an embodiment will be assigned driving or sensing functions. For example, as shown in FIG. 8, the transducers 50 operate as parts of the corresponding driving elements 52 of the sensor 40, while the transducers 58 operate as parts of the corresponding sensing elements 54 that are interleaved with or disposed alternately and regularly between the driving elements 52. The user may, for example, simply reverse the role of the transducers or re-assign some of the transducers to function as driving or sensing elements as desired for a particular application. Although positional interleaving and regularity of the driving and sensing elements of an embodiments of the inertial sensor may increase the isotropy and sensitivity of sensing the motion of a device comprising such embodiment (e.g., the rotational motion of a MEMS-based gyroscope), such disposition of the driving and sensing elements is not generally required for operation of the embodiments of the inertial sensor of the invention.

It should be also appreciated that normal variations in fabrication processes may result in certain deviations of both the structure and uniformity of the embodiments of invention such as, for example, the degree of circularity of the ring or the uniformity of dimensions throughout the frames. As a result, such characteristics of the transducer as mass, geometry, and lever-stiffness may deviate from the expected. If not compensated, such deviations may affect the nature and changes of the ring-oscillation mode and lead to erroneous measurement of the motion of the inertial sensor. To provide for active balancing and compensation of manufacturing defects as well as operational self-calibration of the inertial sensor embodiments, some embodiments may include additional compensating elements designated as 90 in the example of the sensor 40 of FIG. 8. The compensating elements 90 may be configured as metal-piezoelectric-metal layered structures and be electrostatically coupled with the ring 24 through the capacitive gaps between the elements 90 and the ring, may be concentric with the ring, and may be fabricated in a fashion similar to that of the transducers of the invention. It should be understood that, by applying a voltage differential to the compensating elements 90 with respect to the ring, the compensating elements may be used to effectively modify a spring constant of the ring 24, for example, to adjust the resonant frequency of or change the mode of oscillation of the ring. Alternatively, the compensators 90 may also be used to equalize resonant frequencies of the drivers 50 and the sensors 58. In a specific embodiment, the sensitivity of the inertial sensor device 40 of FIG. 8 may be enhanced by interleaving the compensating elements 90 with the drivers 50 and the sensors 58 so as to preserve the symmetry of the device. In general, however, different patterns of disposing the compensating elements among the driving and the sensing elements of an embodiment do not change the principle of operation of the embodiment and are within the scope of the invention. It will be also understood that the described principle of using compensating elements, which allow for adjustment of the resonant frequency of the inertial sensor that has a ring resonator, may be equally applied to any other type of a resonator, such as a linear resonator or a resonator generally shaped as a frame.

As described, embodiments of the invention employ piezoelectric drivers and/or sensors that are mechanically (as opposed to electrostatically) coupled to the resonating mass for respectively driving or sensing the movement of the mass. The piezoelectric principle of operation provides the inertial sensors of the invention with important advantages. First, lateral capacitive coupling to the fixed structural elements of the capacitive-type ring-gyroscopes of prior art is essentially eliminated, and the interaction with the substrate is mechanical and through the anchors. Additionally, the errors, introduced to the performance of the sensor by thermal and external-packaging stresses through unaccounted variations in capacitive gaps, are essentially eliminated. Also, the damping effect is substantially reduced, so a higher quality-factor (Q) can be achieved. Moreover, elimination of the capacitive air-gap also increases tolerance of the ring gyroscope to external vibrations.

Figure 14A:
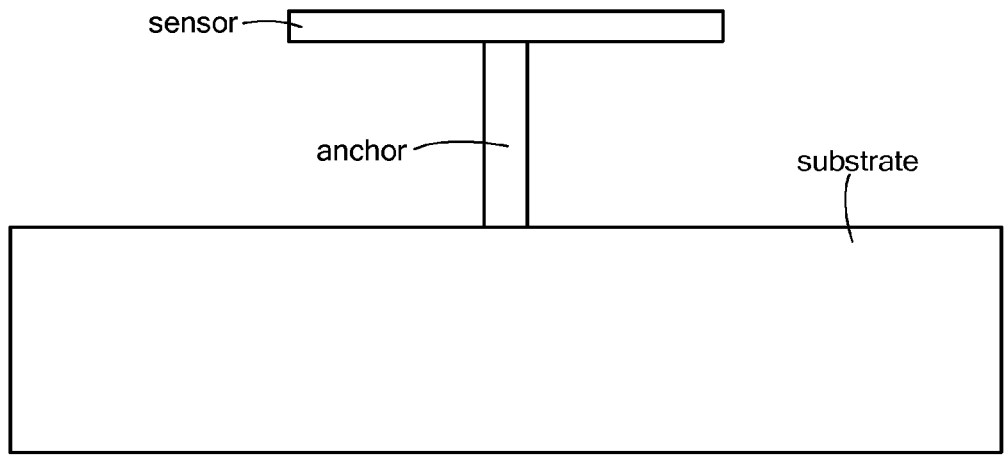
FIG. 14A shows an embodiment comprising an inertial sensor anchored to the underlying leveled substrate and FIG. 14B shows an embodiment comprising an inertial sensor anchored within a recess in the underlying substrate.
Figure 14B:
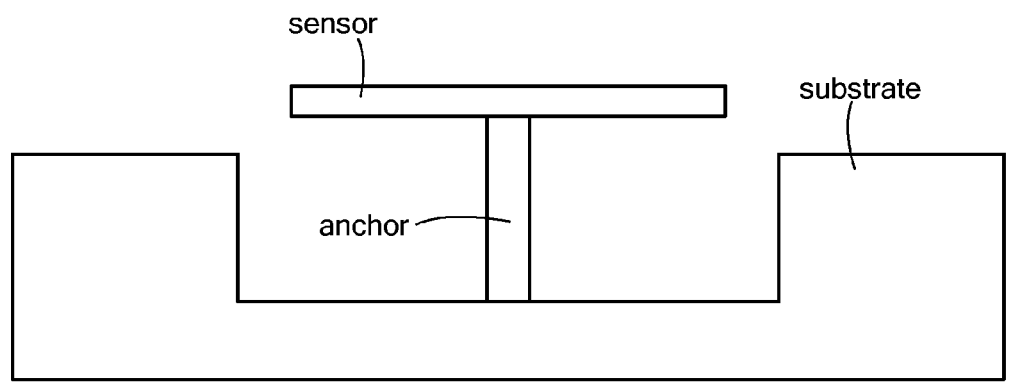

As is known in the art, MEMS-based embodiments of inertial sensors are often susceptible to offsets arising from stresses in the chip due to thermal variations or assembly processes. To reduce such offsets, the support of the body 40 of FIG. 8 (or any other embodiment of the invention) above the underlying substrate may be arranged by affixing, within an inner periphery of the body, a single anchor or multiple anchors 92 (not shown in side view) positioned closely together and near the center of mass of the body 40. Such an exemplary solution was previously disclosed in a commonly assigned U.S. Pat. No. 6,892,576, which is incorporated herein in its entirety by reference. Positioning of the body of the inertial sensor of the invention with respect to the substrate may vary and includes, for example, the affixation of the body above a leveled substrate, as shown in FIG. 14A, or within a recess of a substrate, as shown in FIG. 14B.

Figure 13:
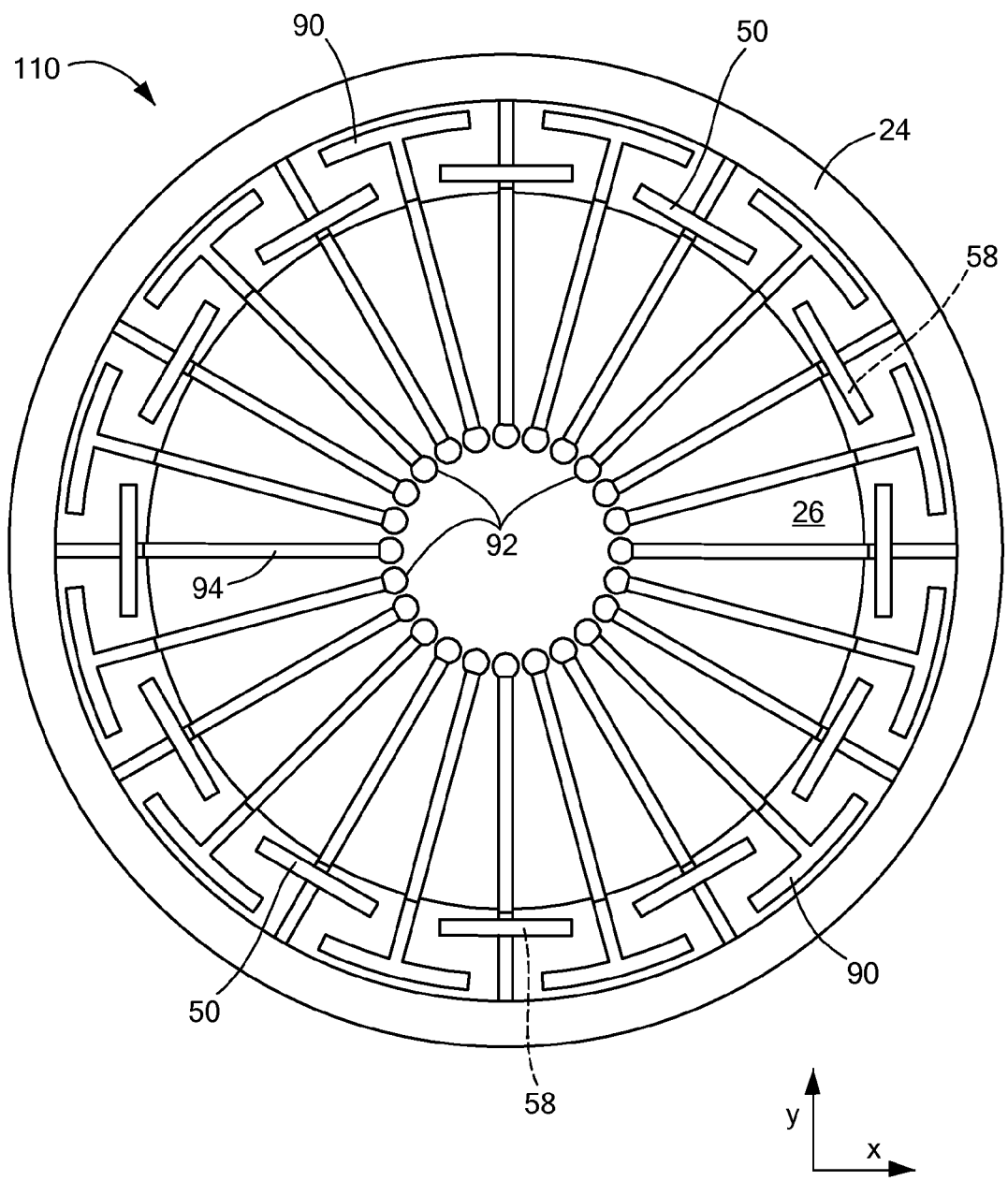
FIG. 13 shows an exemplary embodiment of a MEMS-based inertial sensor of the invention possessing three-fold symmetry.

The embodiments of the invention described above are intended to be merely exemplary; numerous variations and modifications will be apparent to those skilled in the art based on the teachings of this disclosure. Piezoelectric drivers and/ or sensors of the type described above (e.g., with reference to FIGS. 6,8-10,13) can be used in other types of inertial sensors and are not limited to ring gyroscopes. For example, piezoelectric transducers of the invention may be used in linearly resonating MEMS-based structures such as linear resonator gyroscopes. Although the operation of the inertial sensor of the invention was described in reference to an embodiment of FIG. 8 containing four driving elements 52 and four sensing elements 54, it should be understood that there is no theoretical limitation on the number of driving and sensing elements or a particular fashion in which the driving elements operate. For example, in reference to FIG. 8, the ring 24 of the inertial sensor may be driven by the four driving elements 52 that are paired (thus forming one pair of driving elements operating along the x-axis and another pair of driving elements operating along the y-axis) to generate a fundamental mode of in-plane oscillation similar to that of FIG. 7A or FIG. 7B, where the driving elements that are disposed parallel to the x-axis operate with a 180-degree phase shift with respect to the driving elements disposed parallel to the y-axis. The driving elements of the embodiments of the inertial sensor may be generally caused to operate in any desired order with any desired phase shift to put a resonator of the sensor into a mode of oscillation a change to which, produced by the movement of the sensor, may be detected using the piezoelectric effect as discussed. Furthermore, it should be appreciated that a particular degree of symmetry of an embodiment of the invention is not generally required, and that the regularity of form or arrangement in terms of like, reciprocal, or corresponding parts of the embodiments can be chosen as desired for a particular application. For example, a ring embodiment of a transducer of the invention may possess an odd-number operational symmetry, such as an embodiment 110 of FIG. 13, illustrating a variation of a ring-gyroscope with a three-fold symmetry determined by the six driving elements 50, six corresponding sensing elements 58, and twelve compensating elements 90. Electrical circuitry between the transducers and compensating elements of an embodiment and the substrate may be generally established through the anchors 92 via conductors 94 that are deposited on the top or bottom surfaces of the hub, for example, or through vias in the body of the inertial sensor so as to connect the electrodes of the transducers and compensating elements with the anchors 92.

Figure 15:
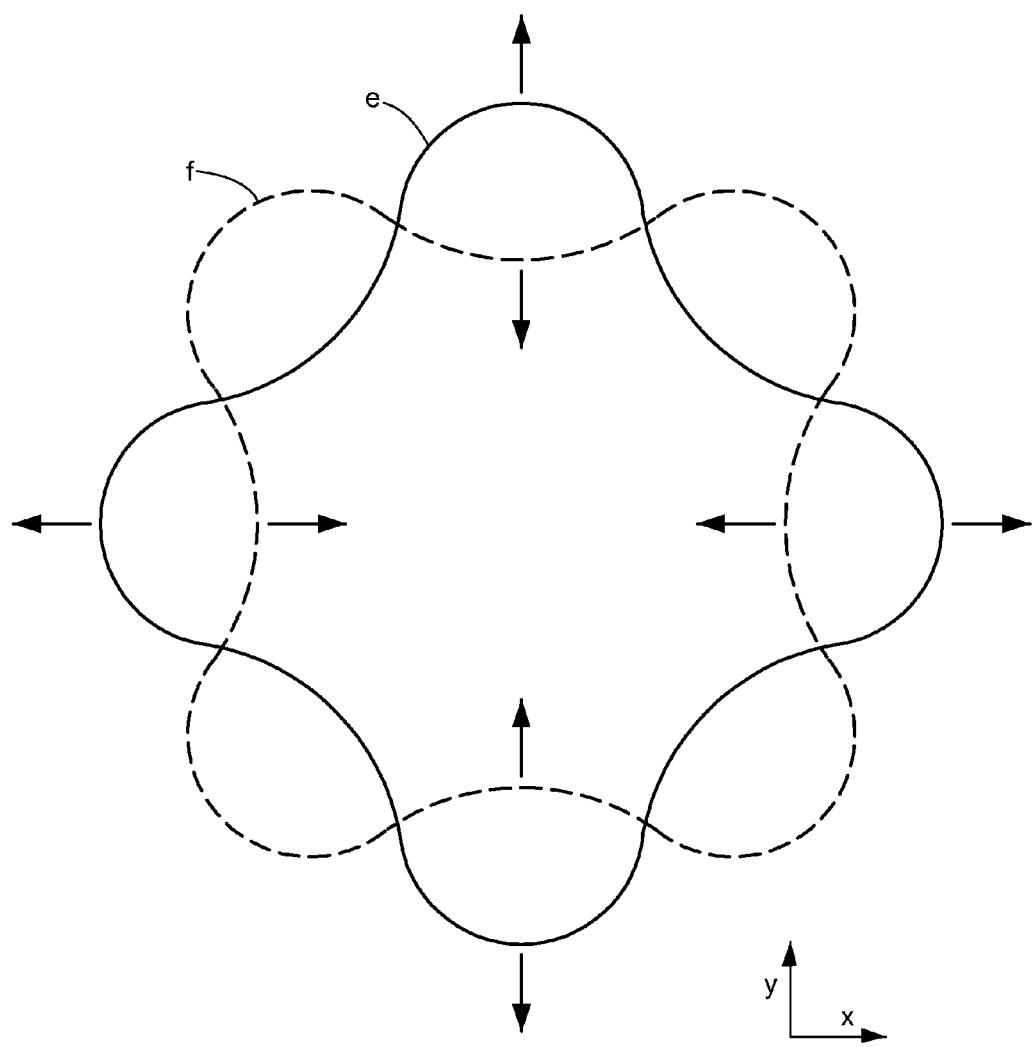
FIG. 15 shows an exemplary four-fold-symmetry oscillation mode in accordance with an exemplary alternative embodiment of the present invention.

While exemplary embodiments using two-fold and three-fold oscillation modes are described above, it should be noted that various alternative embodiments may use four-fold, five-fold, and higher oscillation modes with appropriate numbers of driving elements and sensing elements. FIG. 15 depicts a four-fold oscillation mode in accordance with an exemplary embodiment of the invention, which may employ, for example, eight driving elements arranged at 45 degree intervals and eight sensing elements interspersed between the driving elements. The oscillation modes are depicted as curve e (i.e., the solid curve) and curve f (i.e., the dashed curve) in FIG. 15. It will be apparent to the skilled artisan, based on the teachings of this disclosure, how driving elements and sensing elements may be arranged for this and other oscillation modes.

Additionally, the distribution of driving and sensing roles among the transducers (which are capable of performing in either role, as discussed above) as well as activation of the compensating elements in a particular embodiment may be, for example, pre-programmed and controlled with a processor. In this case, the computer may automatically adjust the performance of a transducer of the invention in response to a feedback signal provided by the compensating elements.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method for modifying an oscillation of a resonator in an inertial sensor, the inertial sensor comprising driving piezoelectric transducers for enabling an oscillation of the resonator and sensing piezoelectric transducers for enabling a detection of a movement of the inertial sensor, the inertial sensor further comprising piezoelectric compensating elements disposed substantially equidistantly among the driving and the sensing piezoelectric transducers, the compensating elements and the resonator forming corresponding capacitors having capacitive gaps, the method comprising:
using the driving piezoelectric transducers to cause oscillation of the resonator; and
modifying the electrostatic charges stored in the capacitors so as to modify the oscillation of the resonator.

2. A method according to claim 1, wherein the inertial sensor is a gyroscope.

3. A method according to claim 1, wherein the resonator is a frame.

4. A method according to claim 1, wherein the inertial sensor further comprises a hub and the resonator is a ring connected to the hub.

5. A method according to claim 1, wherein modifying the stored electrostatic charges equalizes resonant frequencies of the driving and sensing transducers.

6. A method according to claim 1, wherein modifying the stored electrostatic charges adjusts a resonant frequency of the resonator.

7. A method according to claim 1, wherein modifying the stored electrostatic charges changes a mode of oscillation of the resonator.

8. A method according to claim 1, wherein the driving and sensing piezoelectric transducers are disposed symmetrically about the resonator, and wherein the compensating elements are interleaved with the driving and sensing piezoelectric transducers so as to preserve symmetry of the device.

9. A method according to claim 1, wherein the compensating elements are formed substantially from the same material layers as the driving and sensing piezoelectric transducers.

10. A method according to claim 1, wherein modifying the electrostatic charges stored in the capacitors so as to modify the oscillation of the resonator comprises applying a voltage differential to the compensating elements with respect to the resonator.

11. An inertial sensor comprising:
a resonator;
driving piezoelectric transducers for enabling an oscillation of the resonator;
sensing piezoelectric transducers for enabling a detection of a movement of the inertial sensor;
piezoelectric compensating elements disposed substantially equidistantly among the driving and the sensing piezoelectric transducers, the compensating elements and the resonator forming corresponding capacitors having capacitive gaps; and
a processor coupled to the driving piezoelectric transducers and to the sensing piezoelectric transducers, the processor configured to cause oscillation of the resonator via the driving piezoelectric transducers, the processor further configured to modify the electrostatic charges stored in the capacitors so as to modify the oscillation of the resonator.

12. An inertial sensor according to claim 11, wherein the inertial sensor is a gyroscope.

13. An inertial sensor according to claim 11, wherein the resonator is a frame.

14. An inertial sensor according to claim 11, wherein the inertial sensor further comprises a hub and the resonator is a ring connected to the hub.

15. An inertial sensor according to claim 11, wherein modifying the stored electrostatic charges equalizes resonant frequencies of the driving and sensing transducers.

16. An inertial sensor according to claim 11, wherein modifying the stored electrostatic charges adjusts a resonant frequency of the resonator.

17. An inertial sensor according to claim 11, wherein modifying the stored electrostatic charges changes a mode of oscillation of the resonator.

18. An inertial sensor according to claim 11, wherein the driving and sensing piezoelectric transducers are disposed symmetrically about the resonator, and wherein the compensating elements are interleaved with the driving and sensing piezoelectric transducers so as to preserve symmetry of the device.

19. An inertial sensor according to claim 11, wherein the compensating elements are formed substantially from the same material layers as the driving and sensing piezoelectric transducers.

20. An inertial sensor according to claim 11, wherein modifying the electrostatic charges stored in the capacitors so as to modify the oscillation of the resonator comprises applying a voltage differential to the compensating elements with respect to the resonator.

* * * * *